United States Patent [19]

Uecker, deceased et al.

[11] 4,397,253
[45] Aug. 9, 1983

[54] ROPE CLEAT TEETH STRUCTURE

[76] Inventors: Ronald L. Uecker, deceased, late of Wausau, Wis.; by Mary J. H. Uecker, executrix, 918 Fulton, Wausau, Wis. 54401

[21] Appl. No.: 180,694

[22] Filed: Aug. 25, 1980

[51] Int. Cl.³ .............................................. B63B 21/08
[52] U.S. Cl. .................... 114/218; 114/199; 24/134 KB
[58] Field of Search .......... 24/134 KB, 134 P, 136 L, 24/136 R, 134 R, 134 L, 134 N; 114/218, 199

[56] References Cited

U.S. PATENT DOCUMENTS

| | | | |
|---|---|---|---|
| 332,347 | 12/1885 | Keelyn | 114/218 |
| 482,975 | 9/1892 | Cope | 114/218 |
| 805,275 | 11/1905 | Fisher | 114/218 |
| 1,520,716 | 12/1924 | Judd | 114/199 |
| 1,720,037 | 7/1929 | Entwistle et al. | 114/218 |
| 2,608,174 | 8/1952 | Sponenburg | 24/134 |
| 2,627,834 | 2/1953 | Roberts et al. | 114/199 |
| 3,051,116 | 8/1962 | Weil | 114/199 |
| 3,265,032 | 8/1966 | Hume | 114/218 |
| 3,352,273 | 11/1967 | Herreshoff et al. | 114/218 |
| 3,730,129 | 5/1973 | Helms | 114/218 |
| 3,750,611 | 8/1973 | Field | 114/218 |
| 3,765,061 | 10/1973 | Nash | 24/134 KB |
| 3,795,218 | 3/1974 | Merry | 114/218 |
| 4,084,532 | 4/1978 | Feder | 114/218 |
| 4,092,941 | 6/1978 | Gryglas | 114/218 |

FOREIGN PATENT DOCUMENTS 1377316  7/1963  France .................... 114/218

*Primary Examiner*—Robert A. Hafer
*Attorney, Agent, or Firm*—Jacques M. Dulin

[57] ABSTRACT

A cleat formed with an improved rope-engaging surface adapted to facilitate the engagement of a rope and its subsequent release from the cleat. The rope-engaging surface is formed with a first stage raked and slanted teeth structure that tends to be self-feeding for engagement of the rope by the cleat. A second stage raked and slanted teeth structure tends to hold the rope secure within the cleat and also facilitates release of the rope from the cleat. The first and second stage teeth structures are joined by a transitional, curved teeth structure that permits continuous feeding into or release of the rope from the cleat. The teeth structure defined is useful in all types of cleats such as cam cleats, fixed jaw jam cleats, and sliding jaw jam cleats.

23 Claims, 10 Drawing Figures

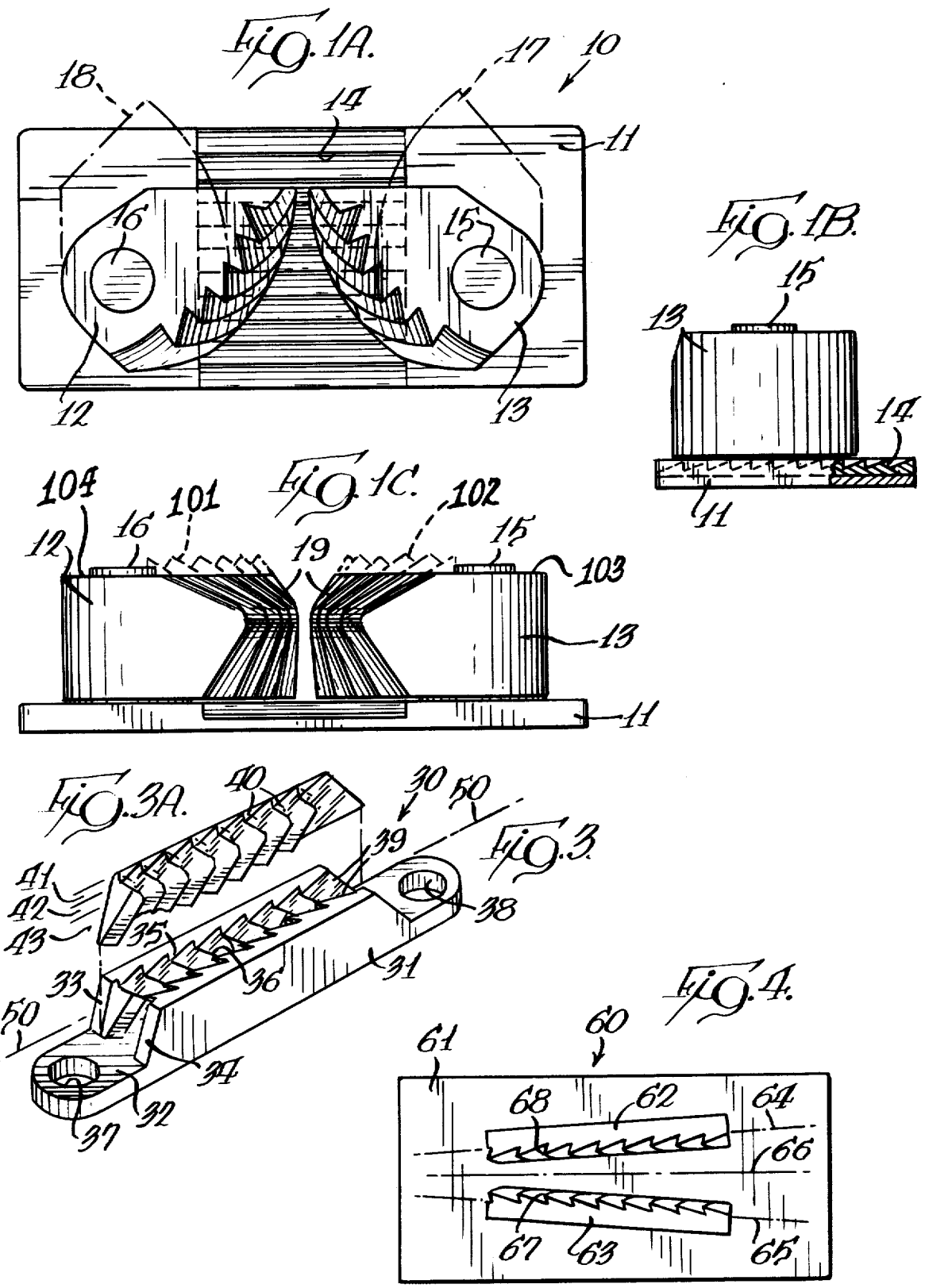

ROPE CLEAT TEETH STRUCTURE

FIELD

This invention relates to the general field of cleats, and more specifically, the invention is directed to improved cleat teeth structures useful in fixed, reciprocating, and angularly displaceable cleats to retain fiber or wire ropes, or cordage. A particularly useful embodiment involves the use of the improved teeth structure of this invention on the rope-engaging face surfaces of cam or jam cleats intended to hold sheets, lines or ropes on sailing vessels.

BACKGROUND

Cam cleats that are used to secure lines or ropes, particularly in sailing craft, are well known in the art. Such cleats generally comprise two opposed and pivoted cam-shaped blocks with arcuate toothed surfaces for gripping the ropes. The toothed surfaces generally are at right angles to the axis of the rope to be engaged. The cam blocks are spring-loaded toward a normally closed position. The toothed cam surfaces are non-concentric with respect to their pivot axes. This non-concentricity results in an increasing distance between the cam surfaces as the cam blocks are opened on their pivot axes.

In operation, such cam cleats most generally are used to engage a rope, sheet, or line while it is under tension. The rope bears laterally against the cam surfaces at the juncture between the cams, and a backward/downward pull on the rope tends to force the cams apart against the spring-loading of the cam blocks. When the cam blocks have opened sufficiently to allow entry of the rope, it must be forced downwardly between the cam teeth. When opposing tension on the free end of the rope is released, the sides of the rope are engaged by the teeth on the cam blocks. The forward pull on the rope tends to close the cam blocks by drag on the teeth, thereby increasing the pinching action of the cam teeth on the rope. To release the rope or sheet, its free end is pulled backwardly to release the pinching or gripping action of the cams, and then the rope is raised upwardly out from between the cleat teeth.

A serious disadvantage of present cam cleats is that they rapidly chafe the rope or line, primarily during entry of the rope into the cleat (cleating) or release from the cleat. This is due to the fact that the teeth faces generally are vertical to the plane of the cleat base, or are slanted backwardly from bottom to top to hold the rope while it is in the cleat. Thus, upon entry or release, the transverse motion of the rope against the relatively sharp edges of the cleat teeth performs a diagonal cutting action on rope fibers. This is particularly the case during release when the rope is under full tension; it is stretched its thinnest, and the person releasing the rope has to pull against the forward pull on the rope to open the cam enough to permit release. In more advanced cleats there are flared ears on the upper surfaces with heavy teeth that provide lead-ins for use during cleating of the rope. Again, in this type of cleat, a diagonal cutting drag is experienced during the cleating procedure as well as during uncleating.

Further, cam cleats of the general type have a limited range of rope diameters that can be accommodated. This range or diameter depends primarily on the degree of concentricity of the arcuate surfaces with respect to their pivot axes. In general, the more concentric the cam surfaces are, the less the maximum distance between the cams when fully opened; but a greater surface area is presented for gripping the rope. Thus any cam cleat design represents a compromise between the holding force desired and the size of the ropes held. For ropes having diameters close to the maximum cam cleat opening, the cutting and abrasion action of the present designs of cleat teeth are severe.

Cleats of the general type are exemplified by the patents to Weil, U.S. Pat. No. 3,051,116; to Hume, U.S. Pat. No. 3,265,032; to Helms, U.S. Pat. No. 3,730,129; to Nash, U.S. Pat. No. 3,756,061; to Merry, U.S. Pat. No. 3,795,218; and to Feder, U.S. Pat. No. 4,084,532. Each of these patents shows a cam cleat of the general type involved and some including the patents to Hume, Helms, Merry and Feder have tapered and toothed rope entry surfaces on the upper edges of the cams to help lever open the cams against the biasing-closed spring force. In these four latter patents, the rope engaging teeth are at right angles to both the longitudinal axis of the rope to be engaged and the baseplate. Nash has teeth that are slightly canted from a vertical plane normal to the axis of the rope, but are tilted or raked backwardly completely from bottom to top as in some conventional jam cleats. Nash does not have tapered entry surfaces. In addition, the slanted surfaces on the teeth of Nash are oriented to effectively resist or deflect the rope away from the rope-engaging teeth. Feder has tapered entry teeth, but the teeth on his entry surfaces are tilted or raked in a direction opposite that contemplated in the present invention, and accordingly work against cam opening and resist easy cleating. Feder's rope gripping teeth are normal to the baseplate. Feder's "teeth" surfaces are multi-plane shapes terminating in planar ridges contacting the rope surface rather than teeth that "bite" into the rope.

Jam cleats are fixed jaw cleats that are tapered in a V-shape from top to bottom. These cleats also have teeth slanted forward from top to bottom to grip the rope. The abrasion and cutting of rope fibers is at least equally, if not more severe in jam cleats than cam cleats because the jaws do not open upon backward pull of the rope to release it. In order to minimize wear on the rope, typical teeth edges are smoothed or rounded, but this sacrifices gripping of the rope. To compensate for slippage, teeth are over-slanted at acute backward angles, a poor compromise, at best.

Sliding jaw cleats are also well known in the art as exemplified in patents to Keelyn, U.S. Pat. No. 332,347; to Cope, U.S. Pat. No. 482,975; to Lowry et al, U.S. Pat. No. 824,556; and to Entwistle et al, U.S. Pat. No. 1,720,037. In such cleats the jaws are usually mounted on slides angled toward each other to provide a decreasing nip as the jaws move forward. Typically such cleats have teeth slanted backward (from bottom to top), or cross-hatched roughened surfaces, or rope conforming surfaces.

Accordingly, there is a need for improved cleat teeth structures adaptable for use in fixed or movable jaw cleats, particularly of the jam, cam or wedge action type cleats, which provide excellent grip on the wire of fiber rope, yet which have improved entry or opening means and permit entry and removal with lessened rope wear.

THE INVENTION

Objects

It is among the objects of the present invention to provide an improved cleat teeth structure applicable to any cleat design, and particularly of the fixed and movable jaw types.

It is another object to provide improved cleat teeth structures that reduce the wear on the rope, while providing equivalent or improved holding power.

It is another object to provide a compound slanted and raked teeth structure that permits easier entry into and removal of ropes from cleats with reduced rope wear.

It is another object to provide improved cleats with a set of teeth on the baseplate which improves the holding action on the rope.

It is another object to provide a compound slanted and raked cleat teeth structure which includes a forward raked and slanted entry portion to facilitate entry and guidance of the rope into the cleat, and in the case of movable jaw cleats facilitates cam or jaw opening by providing pushing surfaces.

It is another object to provide a compound slanted and raked cleat teeth structure which includes forward slanted and forward raked entry portion, a backward slanted and backward raked gripping portion and a transition zone therebetween.

Still further and other objects will be evident from the description and drawings.

BRIEF DESCRIPTION OF DRAWINGS

FIG. 1 is a 3-part view of a movable jaw cam-type cleat employing one embodiment of the teeth structure of the present invention, which includes:

FIG. 1A, being a top view of the cleat showing the 2 cam blocks and baseplate;

FIG. 1B, being a side view of the cleat of FIG. 1A; and

FIG. 1C, being a front view of the cleat of FIG. 1A,

FIG. 2 is a 4-part view of an embodiment of the teeth structure of the invention showing in detail the left hand cam of the cam cleat of FIG. 1, which includes:

FIG. 3 is a partly exploded perspective view of a jam cleat utilizing some of the principles of the present invention; and FIG. 3A is an enlarged fragmentary view of a portion of the toothed rope-engaging surface of FIG. 3.

FIG. 4 is a top view of a sliding jaw type of jam cleat.

DEFINITIONS

Figure 2A:
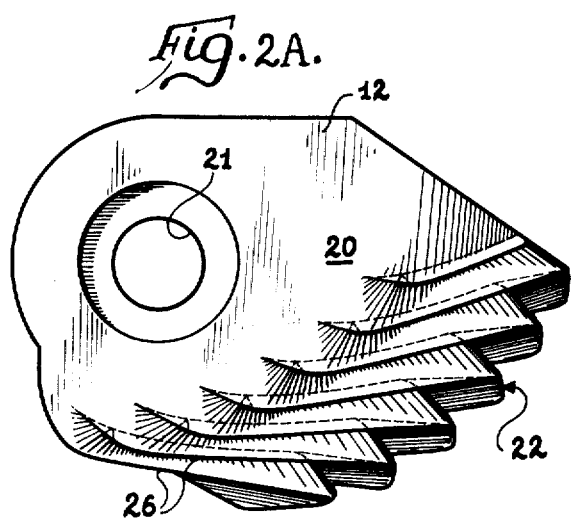
FIG. 2A, being a top view.

As defined herein, the following terminology shall be applied with respect to a cleat and a rope to be engaged by the cleat.

The "forward" direction shall be in the direction of the source of tension in the rope, e.g., from a sail or boom;

the "backward" direction shall be in the direction of the free end of the rope;

the "vertical" direction shll be in a plane perpendicular to the baseplate of the cleat and transverse to the axis of the rope;

the "top" of the cleat shall be in the uppermost surface of the cleat remote from and generally parallel to the baseplate;

the "slant" of the teeth shall mean the angular displacement of the ridge lines of the teeth as measured from the baseplate in a vertical plane which is transverse to the rope axis; "forward slant" thus means the top of the teeth ridge lines are forward of their lower portions or ends and "backward slant" means the opposite;

the "rake" of the teeth shall mean the angular displacement of an individual triangular tooth with respect to its baseline; the baseline being determined between the points of juncture of the tooth with the body of the cleat as seen in a plan view cross-section; e.g., an unraked tooth is defined as having equilateral tooth surfaces, whereas a raked tooth has unequal wall lengths or areas. A tooth "raked forward" has a shorter wall length facing forward whereas a "backward raked" tooth has a longer wall facing forward;

"taper" shall mean a lateral angular diaplacement of the teeth ridge lines with respect to a plane parallel to the axis of the rope. A greater taper means a greater angle of displacement and thus a wider V-shaped entry viewing the cleat from a forward direction position; and "transition" shall mean a tooth ridge line joining teeth slanting in different directions.

SUMMARY

This invention comprises compound cleat teeth structures having what amounts to two sets of teeth with a transition joining the sets. An upper set of tapered teeth is forwardly slanted and forwardly raked to facilitate engagement of the rope for entry into the cleat. The second, or lower set of teeth, is slanted and raked backwardly for engaging the rope and holding it against the baseplate. Curved transition teeth join the upper and lower sets of teeth so that the gripping edges of each set of teeth are continuous. The transition zone preferably is about ⅓ to ½ the distance below the top of the cleat. The vertical height of the lower teeth preferably equals or exceeds the largest rope diameter to be used with the cleat. In addition to the forward rake and the forward slant of the upper teeth, these teeth are tapered or flared outwardly so as to form a V-shaped entry space between the cam blocks. This V-shaped entry preferably has an included angle in a range of about 45 to 60 degrees and may optionally terminate in shoulders rising above the generally planar top surface of the cam. The improved toothed surface of this invention provides an improved opening function in movable jaw cleats, resulting in easier and more synchronous openings of the jaws as the rope is drawn into the cleat, and increases the holding power of the cleat while reducing rope wear.

Another embodiment includes additional holding power for the cleat by the inclusion of a third toothed gripping surface in the baseplate of the cleat. These teeth are raked backwardly and oriented transversely to the rope axis. The backward slant and backward rake of the teeth on the lower surfaces of the cleat jaws tends to force the rope downwardly into contact with the teeth in the baseplate. This design results in decreased wear on the rope by distributing the gripping forces over a greater area of the rope surface.

DETAILED DESCRIPTION

The invention is described in more detail below by way of illustration and not by way of limitation of the principles of the present invention. A cam cleat having one or two rotatable jaws is described as the presently contemplated best mode and preferred embodiment of the invention.

The improved cam cleat of the present invention is illustrated in several views in FIG. 1 and is designated generally by the numeral 10. The cam cleat 10 comprises a baseplate 11 and cam blocks 12 and 13. The baseplate 11 is optionally formed with a set of recessed teeth 14 and a pair of upright pivot pins 15 and 16. The teeth 14 are situated between the pins 15 and 16 parallel to a line joining the pins and are raked backwardly as defined herein. The cam blocks 12 and 13 are pivotally mounted on the pins 16 and 15, respectively. Spring bias means (not shown) are mounted within the cam blocks 12 and 13 and adapted to urge them into a closed position as shown in full section of FIG. 1A. The cam blocks 12 and 13 can be swung apart against the force of the spring bias to a fully opened position as shown in dotted sections 17 and 18. A tapered or flared entry groove 19 is defined between the upper edges of the cam blocks 12 and 13. Optionally the upper teeth may terminate in shoulders 101 and 102 (FIG. 1C) which extend above the generally planar top surfaces 103, 104 of the cams, to extend the entry taper so it will accept larger ropes or lines in a self-centering action. The cam blocks 12 and 13 preferably are formed by molding or machining a metal, or formed from a plastic material (such as delrin or a phenolic) which may be fiber filled and which forms a tough rigid solid.

Figure 2B:
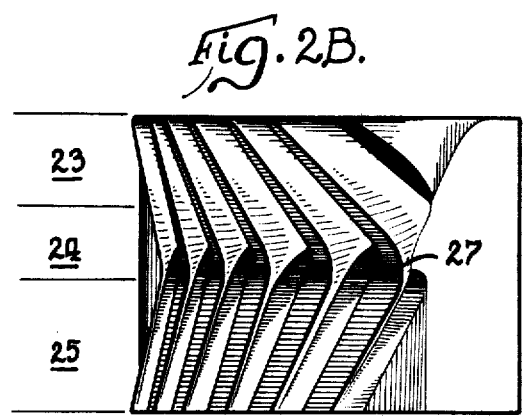
FIG. 2B, being a side view of block of FIG. 2A.
Figure 2C:
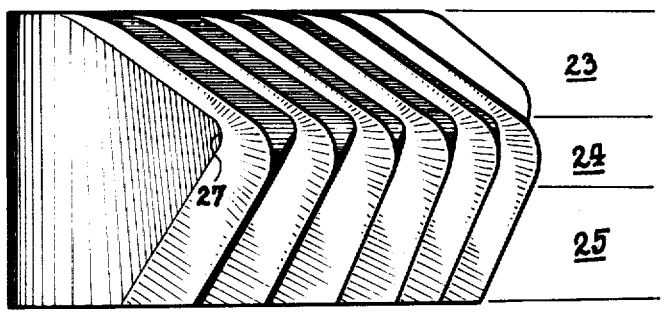
FIG. 2C, being a front view of the block of FIG. 2A.
Figure 2D:
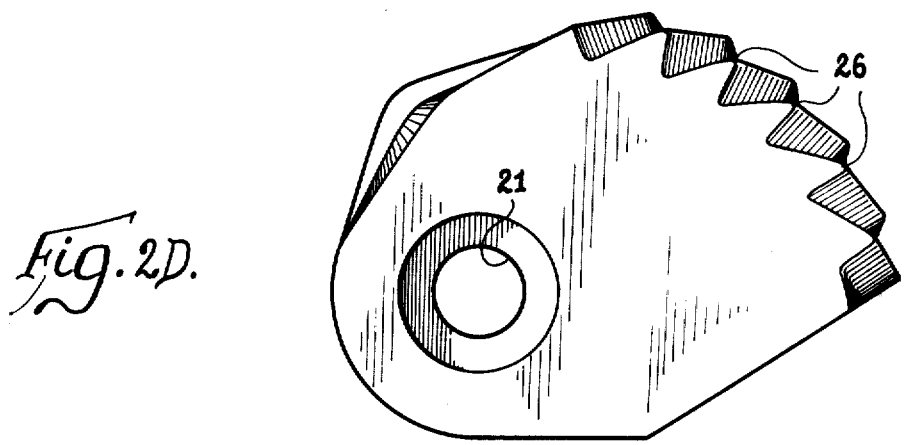
FIG. 2D, being a bottom view.
Figure 2A:
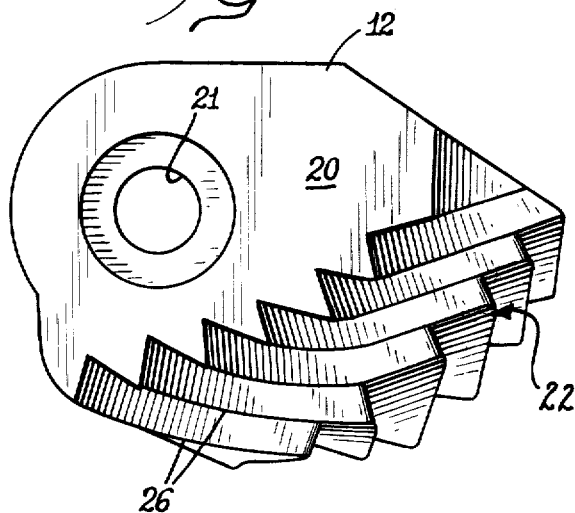
Figure 2B:
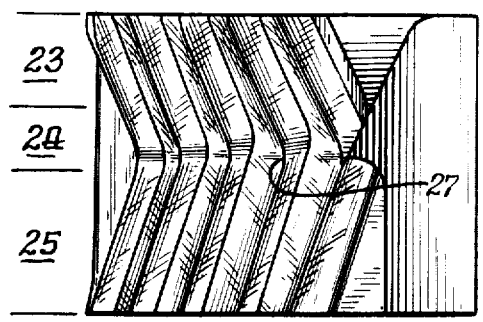
Figure 2C:
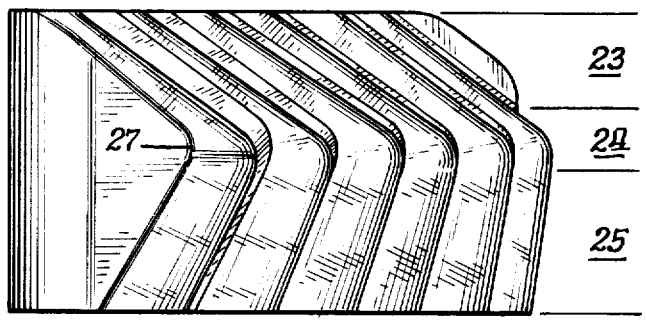
Figure 2D:
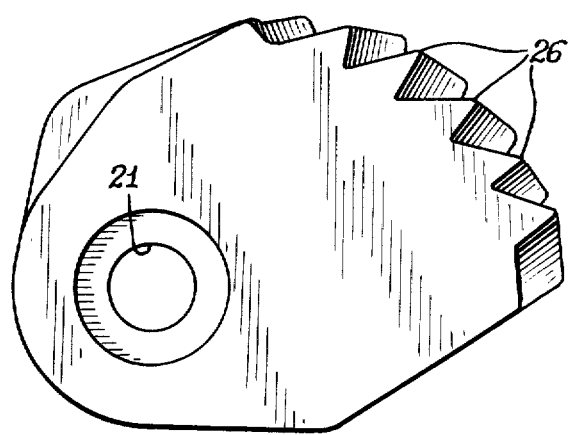

The improved cam surface structure is illustrated in greater detail in FIGS. 2A–2D for the cam block 12. It is to be understood that a corresponding mirror image surface structure appears on the cam block 13. The cam block 12 comprises a rigid body portion 20 formed with a cylindrical bore 21 for receiving the pivot pin 16 and an arcuate toothed cam surface designated generally by the numeral 22. Referring to FIGS. 2B and 2C, the cam surface is seen to be divided into three zones, an entry stage or zone 23, a transition zone 24, and a lower locking stage or zone 25. The cam surface 22 is formed with a plurality of continuous teeth 26. The teeth 26 are slanted in a forward direction, as defined herein, in the entry zone 23 and slanted in the backward direction of the locking zone 25. In addition, the teeth 26 are optionally but preferably formed with a forward rake in the entry zone 23 and with a backward rake in the locking zone 25. The peaks of the teeth 26 are curved to form concave cusps 27 in the transition zone 24.

In addition to the forward slant and forward rake of teeth 26 in the entry zone 23, the teeth are flared or tapered outwardly to form an entry V-shaped groove 19. This groove optionally can be widened by providing shoulders 101, 102 (FIG. 1C). In the locking zone 25 the peaks of the teeth 26 are slanted backward and lie in an arcuate plane perpendicular to the baseplate 11.

In operation, the improved cam cleat blocks 12 and 13 function as follows: A rope under tension is placed laterally into the V-shaped entry groove 19. The rope is pulled backward against tension and engages the teeth 26. The forward slant of the teeth in entry zone 23 act as a plurality of inclined planes to direct the rope downward and into the transition zone 24. The forward rake of the teeth 23 provides pushing surfaces which operate to open the blocks 12 and 13 as the rope is pulled backward. Once the blocks have opened to the diameter of the rope, it is guided by the transition zone teeth 24 to the locking zone teeth 25. The spring bias built into the cam blocks 12 and 13 tends to force the teeth 26 into sufficient engagement with the rope that when the free end of the rope is released, the teeth 26 pinch against the rope tending to further close the cam block 12 and 13 and exerting a holding force equal to the tension in the rope. The backward slant of locking zone teeth 25 draws the rope downward as the rope is let go forward under natural forward tension so the full diameter of the rope is gripped. Where teeth 14 have been proved in the baseplate 11, the backward slant will direct the rope downward into engagement with teeth 14. Thereafter any increase in tension in the rope is balanced by increased cam pressure and a component of force exerted by the teeth 14 in the baseplate 11. The fact that the gripping force is distributed over three sets of teeth rather than only two as in a conventional cam cleat also results in reduced wear on the rope.

In conventional cam cleats the rope frequently is very tightly engaged and is difficult to release from the cleat. In the present invention, the tooth structure defined tends to facilitate release from the cleat 10 as follows: The free end of the rope engaged by the cleat 10 is pulled backward and upward from the locking zone 25. The backward slant and the backward rake tends to cause the rope to slide transversely upward into the transition zone 24. The cusps 27 of the teeth 26 tend to catch the rope and force the blocks 12 and 13 apart thereby reducing the gripping force of the blocks on the rope. Thereafter the rope passes easily through the entry zone 23. In contrast, in prior art cleats, the entire or lower portion teeth are vertical, or upper portion of the teeth are backward slanted and/or raked, all of which causes excess wear on the rope due to transverse motion of the rope with respect to the teeth.

The preferred embodiment shown and just described includes a pair of opposed cam blocks 12 and 13. It is to be understood that the three-zone tooth structure of this invention is applicable to cleats of the type having a single cam block and an opposed fixed rope engaging surface. Such cleats may also employ the baseplate tooth structure disclosed herein. Further, such cam blocks may be replacement cam blocks for retrofit installation, or may be in the form of a hollow shell to snugly fit over existing cams.

Referring now to FIG. 3, the principles of the present invention are shown as utilized in a fixed jaw jam cleat designated generally by the numeral 30. Cleat 30 comprises a unitary body 31 formed with a horizontal base portion 32 and upright side portions 33 and 34. The interior surfaces of the upright portions 33 and 34 are formed with improved rope engaging surfaces 35 and 36 respectively. The details of structure of the surface 35 are illustrated more clearly in the enlarged view of FIG. 3A. It is to be understood that the rope-engaging surface 36 on the interior of upright portion 34 is substantially a mirror image of the surface 35 shown in FIG. 3A. The base portion 32 may be formed with holes 37 and 38 for attaching the cleat 30 to a deck or railing of a boat. The space between the upright portion 33 and 34 defines a rope engaging slot 39 which is tapered outwardly from bottom to top.

The improved teeth structure of the tooth surface or plate 35 comprises a plurality of angular teeth 40 set generally parallel to each other. The teeth structure of surface 35 is divided into three parallel zones numbered from top to bottom. The top zone or stage 41 is the entry zone, the bottom zone 43 is the locking zone and the intermediate or transition zone 42 separates the entry and locking zones. The ridge lines 44 of the teeth 40 are continuous so as to insure easy passage of a rope from the entry zone 41 into the locking zone 43. The teeth 40 in the entry zone are formed with a forward slant in the entry zone 41 and with a backward slant in the locking zone 43. In addition the teeth 40 are formed with a forward rake in the entry zone and with a backward rake in the locking zone 43. The cleat 30 having a fixed dimension rope engaging slot 39 is sized to accommodate ropes having a predetermined range of diameters. The inner surface of the two plates 35 and 36 are preferably oriented tapered toward each other at the bottom to assist in rope entry and to provide better gripping over a wider range of rope diameters.

In operation the improved rope cleat teeth structure of cleat 30 functions as follows. A rope 50 to be engaged by the cleat 30 is aligned longitudinally with the slot 39 and placed laterally into it between the rope-engaging surfaces 35 and 36. Tension in the rope 50 is established from the forward direction as shown in FIG. 3. The rope 50 is caused to engage the cleat 30 by a backward and downward pull on the free end of the rope 50. The rope 50 is engaged by the teeth 40 in the entry zone 41 and because of their forward slant and rake, the teeth act as a plurality of inclined planes for guiding the rope downward into the slot 39. As the rope 50 passes from the entry zone 41 through the transition zone 42 and into the locking zone 43, the tension on the free end of rope 50 is released. The backward slant and rake of the teeth 40 in the locking zone 43 again act as inclined planes for guiding the rope laterally downward toward the base portion 32. Thereafter increased tension in the rope 50 from the forward direction tends to force the rope 50 further downward into the slot 39 so as to be engaged more tightly by the teeth 40. Baseplate mounted, forward raked transverse teeth (not shown) as in FIG. 1A may be placed at the bottom of the slot 39.

The release of the rope 50 from the cleat 30 is accomplished by a backward and upward pull on the free end of the rope. The backward rake and slant of the teeth 40 in the locking zone 43 again act as a plurality of inclined planes for directing the rope backward and upward out of the locking zone 43. Once the rope passes through the transition zone 43 and through the entry zone 41 the free end of the rope is released. It should be noted that the slant and rake of the teeth 40 on cleating and release are such as to minimize the cutting action of the ridge lines 44 of the teeth 40 against the outer surfaces of the rope 50. The fact that the rope 50 tends to move parallel to, rather than transversely to the direction of the ridge lines 44 of the teeth 40 tends to minimize the abraiding action of the teeth 40 against the rope 50.

Referring now to FIG. 4, there is illustrated a movable jaw type of jam cleat designated generally by the numeral 60. The cleat 60 comprises the fixed base 61, and a pair of opposed movable jaws 62 and 63 mounted thereon. The jaws 62 and 63 are mounted to move longitudinally on guide rods 64 and 65 (shown schematically) respectively. The guide rods 64 and 65 are mounted on and parallel to the base portion 61 and are angled outward in the backward direction with respect to a center line axis 66. Resilient means (not shown) may be attached to or mounted within the jaws 62 and 63 and biased so as to urge the jaws 62 and 63 longitudinally along the rods 64 and 65 toward a minimum separation or decreasing nip. The interior rope-engaging surfaces 67 and 68 of the jaws 62 and 63, respectively, may be substantially identical to surfaces 35 and 36 of the cleat 30.

The movable jaw cleat 60 operates in substantially the same manner as the fixed jaw cleat 30 except that it is able to accommodate a larger range of rope diameters and the teeth function to open the nip as in the cam cleat of FIG. 1A. The range of rope diameters that can be accommodated is determined by the degree of taper of the jaws 62 and 63 and the degree and length of the angle between the rods 64 and 65.

It should be understood that the cleat teeth structures of this invention may be employed as integral parts of the combination of elements forming the cam, and jaw cleats described, or may be employed as cam parts, plates or inserts to replace present teeth structures. For cam cleats they may be cap-like structures to fit over existing cams. Further, an actuating lever engaging said cam block or slidinhg jaw may be provided to permit opening of the nip by rope or manual pressure thereon.

The invention shown and described is by way of example and it is to be understood that many changes and modifications may be made without departing from the spirit of the invention. The invention is not to be considered as limited to the embodiment shown and described except insofar as the claims may be so limited.

I claim:

1. An improved cam cleat for receiving and gripping a rope under tension comprising in operative combination:
   (a) a baseplate;
   (b) at least one vertical pivot pin mounted on said baseplate;
   (c) a cam block mounted on said pin and adapted to turn through an angular displacement thereof;
   (d) a plurality of rope-engaging teeth formed on a side surface of said cam block;
      (i) an upper portion of said teeth being adapted to form a rope entry zone wherein said teeth are slanted forwardly from bottom to top with respect to said baseplate and to the source of tension in the rope;
      (ii) a lower portion of said teeth being adapted to form a locking zone wherein said teeth are slanted backwardly from bottom to top with respect to said baseplate and to the source of tension;
      (iii) an intermediate portion of said teeth includes a curse transition zone between and joining said entry zone and said locking zone teeth; and
      (iv) the ridge lines of said teeth are continuous throughout said three defined zones; and
   (e) surface means spaced from said pin for forming a rope receiving and gripping nip between said cam block side surface teeth and said surface means; said combination providing ease of rope entry reduction in rope wear upon cleating and releasing said rope, and improved rope downward and gripping in said locking zone.

2. A cleat as in claim 1 wherein said teeth in said entry zone are additionally characterized by a forward rake so as to form downwardly guiding planes when engaging a rope and effective to direct the rope into said locking zone.

3. A cleat as in claim 2 wherein the teeth in said locking zone are additionally characterized a backward rake whereby a rope engaged by said cam block is directed toward contact with said baseplate and is gripped by broad surface planes.

4. A cleat as in claim 3 wherein said baseplate is formed with a plurlity of rope engaging teeth on the upper surface of said baseplate and oriented transversely with respect to the longitudinal axis of a rope to be engaged, and said teeth formed on said baseplate are additionally characterized by a backward rake with respect to the source of tension in the rope engaged.

5. A cleat as in claim 4 wherein said teeth defining said entry zone are tapered outwardly with respect to an axis vertical to said baseplate.

6. A cleat as in claim 5 wherein said entry zone teeth terminate in shoulders extending above a top surface of said cam block.

7. A cleat as in claim 3 which includes:
(a) a pair of vertical pivot pins mounted on said baseplate; and
(b) a pair of said cam blocks mounted opposed on said pins and adapted to turn through an angular displacement thereon, with each block being formed with said rope-engaging teeth on the outer surfaces thereof, and one of said cam blocks functioning as said surface means.

8. A cleat as in claim 7 wherein said surface means comprises a fixed, generally vertical planar member which includes a three-zone teeth structure as defined in claim 4.

9. A cleat as in claim 1, which includes an actuating lever engaging said cam block to permit opening and closing said nip.

10. Improved teeth structure for a cleat assembly adapted to be mounted on a baseplate comprising:
(a) means for grippingly engaging a rope having a rope-engaging surface,
(b) a plurality of generally parallel, rope-engaging teeth formed on said surface;
  (i) an upper portion of said teeth being adapted to form a rope entry zone wherein said teeth are slanted forwardly from bottom to top with respect to said baseplate and to the source of tension in the rope;
  (ii) a lower portion of said teeth being adapted to form a locking zone wherein said teeth are slanted backwardly from bottom to top with respect to said baseplate and to the source of tension;
  (iii) an intermediate portion of said teeth includes a curved transition zone between and joining said entry zone and said locking zone teeth; and
  (iv) the ridge lines of said teeth are continuous throughout said three defined zones so that said ridge lines form generally a V configuration pointing backwardly with respect to the base plate.

11. An improved cleat teeth structure as in claim 10 wherein said teeth in said entry zone are additionally characterized by a forward rake so as to form downwardly guiding planes when engaging a rope and effective to direct the rope into said locking zone.

12. An improved cleat teeth structure as in claim 11 wherein the teeth in said locking zone are additionally characterized a backward rake whereby a rope engaged by said cam block is gripped by broad surface planes.

13. An improved cleat teeth structure as in claim 12 wherein said entry zone teeth are tapered outwardly with respect to the plane of the locking zone teeth.

14. An improved cleat teeth structure as in claims 13 wherein said entry zone teeth terminate in shoulders extending above a top surface of said gripping means.

15. An improved cleat teeth structure as in claim 10 wherein said structure is a cam block.

16. An improved cam cleat having the teeth structure as in claim 10.

17. An improved cam cleat having the teeth structure as in claim 10, and which includes a teeth member in the baseplate of said cleat, said baseplate teeth being transverse to the rope axis and being raked backward.

18. An improved cleat teeth structure as in claim 10 wherein said structure is a fixed jam cleat teeth member.

19. An improved cleat teeth structure as in claim 10 wherein said structure is a movable jaw jam cleat teeth member.

20. An improved fixed jaw jam cleat having the teeth structure as in claim 10.

21. An improved movable jaw jam cleat having the teeth structure as in claim 10.

22. An improved fixed jaw jam cleat having the teeth structure as in claim 10, and which includes a teeth member in the baseplate of said cleat, said baseplate teeth being transverse to the rope axis and being raked backward.

23. An improved movable jaw jam cleat having the teeth structure as in claim 10, and which includes a teeth member in the baseplate of said cleat, said baseplate teeth being transverse to the rope axis and being raked backward.

* * * * *